United States Patent
Luo et al.

(10) Patent No.: US 10,587,510 B2
(45) Date of Patent: Mar. 10, 2020

(54) NETWORK FUNCTION VIRTUALIZATION USING TAGGED ACCESS PORTS

(71) Applicant: INTERNATIONAL BUSINESS MACHINES CORPORATION, Armonk, NY (US)

(72) Inventors: Ji Luo, Beijing (CN); Jian Qun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/829,450

(22) Filed: Dec. 1, 2017

(65) Prior Publication Data

US 2019/0173783 A1    Jun. 6, 2019

(51) Int. Cl.
*H04L 12/741*    (2013.01)
*H04L 12/46*    (2006.01)

(52) U.S. Cl.
CPC ............ *H04L 45/74* (2013.01); *H04L 12/467* (2013.01); *H04L 12/4645* (2013.01)

(58) Field of Classification Search
CPC ............................ H04L 45/74; H04L 12/4645
See application file for complete search history.

(56) References Cited

U.S. PATENT DOCUMENTS

| | | | |
|---|---|---|---|
| 7,983,258 B1 | 7/2011 | Ruben | |
| 8,667,574 B2 | 3/2014 | Piazza | |
| 8,670,450 B2 | 3/2014 | Biswas et al. | |
| 8,750,165 B2 | 6/2014 | Himura | |
| 8,842,579 B2 | 9/2014 | Bulusu et al. | |
| 2011/0035494 A1* | 2/2011 | Pandey | G06F 9/5077 709/224 |
| 2011/0173285 A1 | 7/2011 | Cripe et al. | |
| 2016/0182293 A1* | 6/2016 | Di Benedetto | H04L 41/0816 709/221 |
| 2016/0380833 A1* | 12/2016 | Zhu | H04L 12/4633 709/223 |
| 2017/0111231 A1* | 4/2017 | Ashida | H04L 41/12 |
| 2017/0222881 A1* | 8/2017 | Holbrook | H04L 43/0876 |

(Continued)

OTHER PUBLICATIONS

Wells, "VLAN trunking networks for NFV", Printed on Oct. 30, 2017, 3 Pages, https://blueprints.launchpad.net/neutron/+spec/nfv-vlan-trunks.

(Continued)

*Primary Examiner* — Brian D Nguyen
(74) *Attorney, Agent, or Firm* — Erik K. Johnson

(57) ABSTRACT

An embodiment of the invention may include a method, computer program product, and computer system for handling virtual network traffic. The embodiment may include a computing device receiving a data packet by a virtual LAN (VLAN) located on a switch. The embodiment may include determining a virtual device, located on a physical device, associated with the data packet. The embodiment may include determining a tagged access port between the switch and the physical device, wherein the tagged access port handles all network traffic between the switch and the physical device. The embodiment may include determining a VLAN-ID based on the tagged access port and the virtual device. The embodiment may include routing the data packet to the virtual device based on the VLAN-ID.

14 Claims, 5 Drawing Sheets

(56) References Cited

U.S. PATENT DOCUMENTS

2017/0237668 A1* 8/2017 Hall .................. H04L 29/06
                                                  370/235
2017/0353328 A1* 12/2017 Chickering ........... H04L 12/437
2018/0349163 A1* 12/2018 Gao ................... G06F 9/45558

OTHER PUBLICATIONS

Mell et al., "The NIST Definition of Cloud Computing", NIST, Sep. 2011, 7 Pages, Special Publication 800-145, U.S. Department of Commerce, Gaithersburg, MD.
Kothari, "Blueprint VLAN Trunking Networks for NFV", Community Heartbeat, Jun. 4, 2014, 2 Pages, http://stackalytics.com/report/blueprint/neutron/nfv-vlan-trunks.

* cited by examiner ional network protection units. Other examples of NFV include virtualized load balancers, firewalls, intrusion detection devices and WAN accelerators.

NETWORK FUNCTION VIRTUALIZATION USING TAGGED ACCESS PORTS

BACKGROUND

The present invention relates to virtual networks, and more specifically, to communication between a virtual LAN and virtual device in a virtual network.

Network functions virtualization (also Network function virtualization or NFV) is a network architecture concept that uses the technologies of IT virtualization to virtualize entire classes of network node functions into building blocks that may connect, or chain together, to create communication services. NFV relies upon, but differs from, traditional server-virtualization techniques, such as those used in enterprise IT. A virtualized network function, or VNF, may consist of one or more virtual machines running different software and processes, on top of standard high-volume servers, switches and storage devices, or even cloud computing infrastructure, instead of having custom hardware appliances for each network function. For example, a virtual session border controller could be deployed to protect a network without the typical cost and complexity of obtaining and installing physical network protection units. Other examples of NFV include virtualized load balancers, firewalls, intrusion detection devices and WAN accelerators.

BRIEF SUMMARY

An embodiment of the invention may include a method, computer program product, and computer system for handling virtual network traffic. The embodiment may include a computing device receiving a data packet by a virtual LAN (VLAN) located on a switch. The embodiment may include determining a virtual device, located on a physical device, associated with the data packet. The embodiment may include determining a tagged access port between the switch and the physical device, wherein the tagged access port handles all network traffic between the switch and the physical device. The embodiment may include determining a VLAN-ID based on the tagged access port and the virtual device. The embodiment may include routing the data packet to the virtual device based on the VLAN-ID.

DETAILED DESCRIPTION

Figure 1:
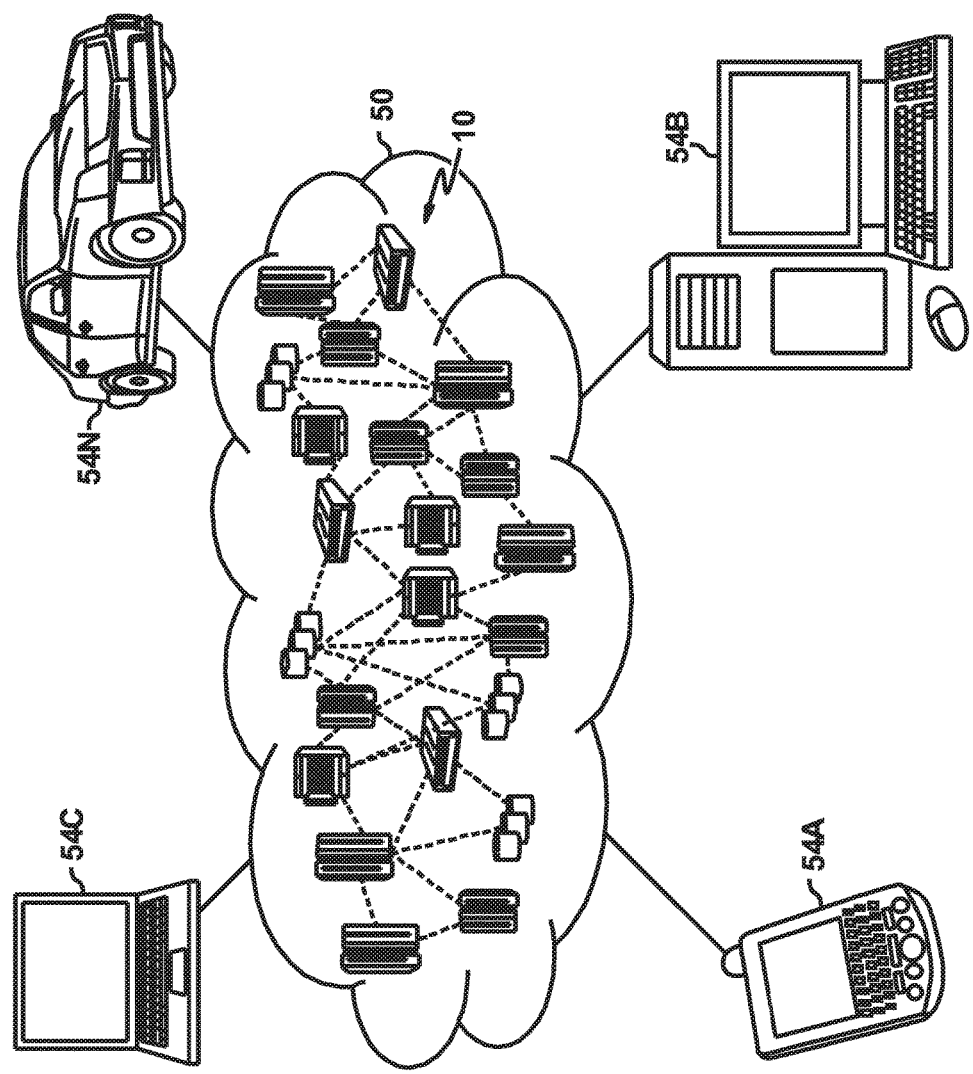
FIG. 1 depicts a cloud computing environment according to an embodiment of the present invention.

Embodiments of the present invention will now be described in detail with reference to the accompanying Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
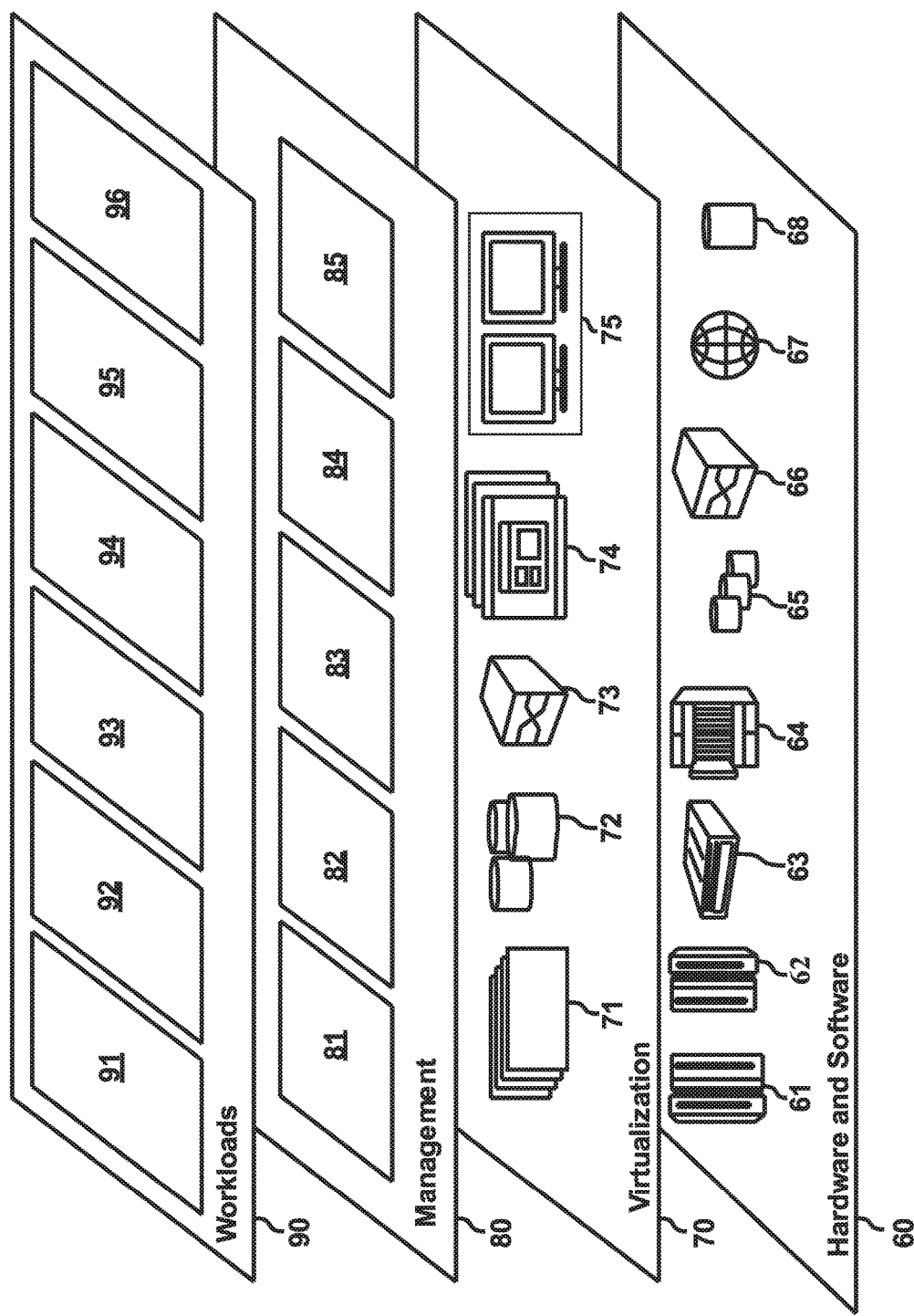
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, using methods such as those described below and including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In an NFV system, network functions can be virtualized. Multiple virtual network device can run inside one physical device. A virtual network device includes a virtual firewall, a virtual router, a VPN gateway, and many types of network security device. Physical devices that can run multiple virtual network devices inside it includes general servers, dedicated firewall hardware, and even traditional switches and routers. The number and type of virtual network devices running inside a physical device are dynamic. They can be dynamically created, modified, or deleted according to system needs.

To process network traffic using the virtual devices, the devices need to connect to ethernet switches. Common ethernet switches have 2 types of port, access and trunk. An access port belongs to a particular VLAN. Ingress packets will be forwarded in this VLAN. Egress packet will be untagged and sent out. A trunk port belongs to multiple VLAN. Ingress packets are tagged and will be forwarded in the VLAN denoted by tag. Egress packets will keep their VLAN tag when being sent out.

Considering the dynamic nature of NFV, access port is suboptimal. This approach requires one physical cable for each port of each virtual device. Typically, a trunk is assigned one VLAN tag to each virtual device port. Thus, every virtual device uses a different VLAN and serve for the traffic from that VLAN.

However, there are scenarios that need to put multiple virtual devices into same VLAN. For example, when connecting the uplinks of multiple virtual devices to the VLAN in which upstream gateway stays. In such case, the trunk approach does not work, and an access port method is required.

The use of access port to connect NFV devices may have many problems. The inevitable manually cabling work is slow, expensive, and error-prone, which cancels out the advantage of NFV. This approach may need many ports of the device hosting the NFVs and the associated switch. One pair for each virtual device port, which may not scale. Additionally, while general servers have the processing power to handle multiple, or even hundreds of, NFVs, they lack physical ports, which limit the number of NFVs that can be implemented. A method is provided to enable a single cable between a switch and device to handle virtual routing of information to a plurality of NFV devices on the device.

Figure 3:
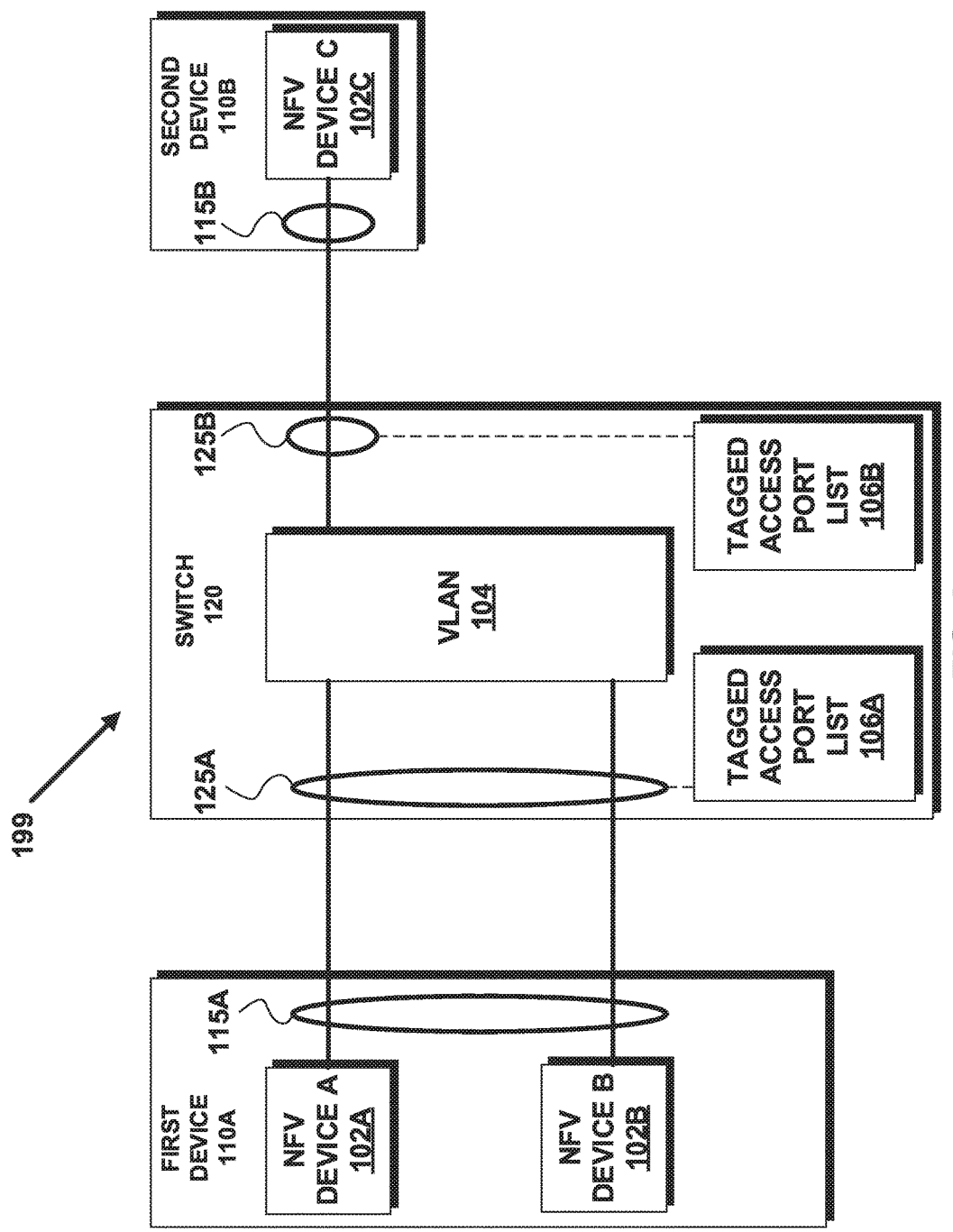
FIG. 3 illustrates a virtualized network infrastructure, in accordance with an embodiment of the invention.

FIG. 3 illustrates a virtual network with tagged access ports 199, in accordance with an embodiment of the invention. In an example embodiment, virtual network with tagged access ports 199 includes a first device 110A a second device 110B connected by a switch 120.

First device 110A may include NFV Device 102A, NFV Device 102B, and second device 110B may include NFV Device 102C. First device 110A and second device 110B (collectively "the devices 110" or generally "the device 110") may be a server, a desktop computer, a notebook, a laptop computer, a tablet computer, a handheld device, a smart-phone, a thin client, or any other electronic device or computing system capable of receiving and sending data to and from other computing devices, and handling operation of a virtualized device, such as NFV device 102A. First device 110A and second device 110B may be connected to each other through a switch 120, using an ethernet port 115A and ethernet port 115B, respectively, that are configured as 802.1Q trunk ports. First device 110A and second device 110B are described in more detail with reference to FIG. 5.

NFV device 102A, NFV device 102B, and NFV device 102C (collectively "NFV devices 102" or generally as "NFV device 102") are virtual devices performing operations in a Network Functions Virtualization (NFV) environment. Each NFV device 102 may have a VLAN-ID (or sub-interface tag) associated with the device, and may be serviced by an associated sub-interface of a port of the first device 110A or second device 110B. In the virtual network with tagged access ports 199, each NFV device has a different virtual MAC address.

A switch 120 is a network switch directly connected to the first network device 110A and second network device 110B. Switch 120 may include a VLAN 104 and a tagged access port list 106. The switch may have a tagged access port 125A connecting the switch to first device 110A and a tagged access port 125B connecting the switch to second device 110B. However, in other embodiments where more than one switch is necessary to transmit data from the first device 110A to the second device 120B, an instance of VLAN 104 may be located on each switch, and may act similarly to this switch.

VLAN 104 is a virtual local area network device located on switch 120, or across multiple switches, to aid in implementing a virtual network. VLAN 104 routes the data packets to the respective NFV devices 102 connected by VLAN 104. VLAN 104 does this by replacing the VLAN tag with a tagged access port ID based on specific information for only tagged access port 125A, which signifies the NFV device 102 to receive the data packet from the tagged access port 125A. Methods of handling packet ingress and egress are described in further detail below with regard to FIG. 4A and FIG. 4B, respectively.

Tagged access port list 106A and tagged access port list 106B (collectively "tagged access port lists 106" or generally as "tagged access port list 106") are databases relating a VLAN ID of an NFV device 102 with the virtual MAC address. Additionally, tagged access port list 106 may relate the tagged access port 125A of the switch 120 to the virtual MAC addresses. The tagged access port list 106 may be a list for access by the VLAN 104 on switch 120 to determine the appropriate tag for traffic going through a tagged access port 125. For example, while the tagged access port list 106A may be located anywhere in the virtual network, the VLAN-IDs contained in the list are only applicable to the specific tagged access port 125A of switch 120.

Figure 4A:
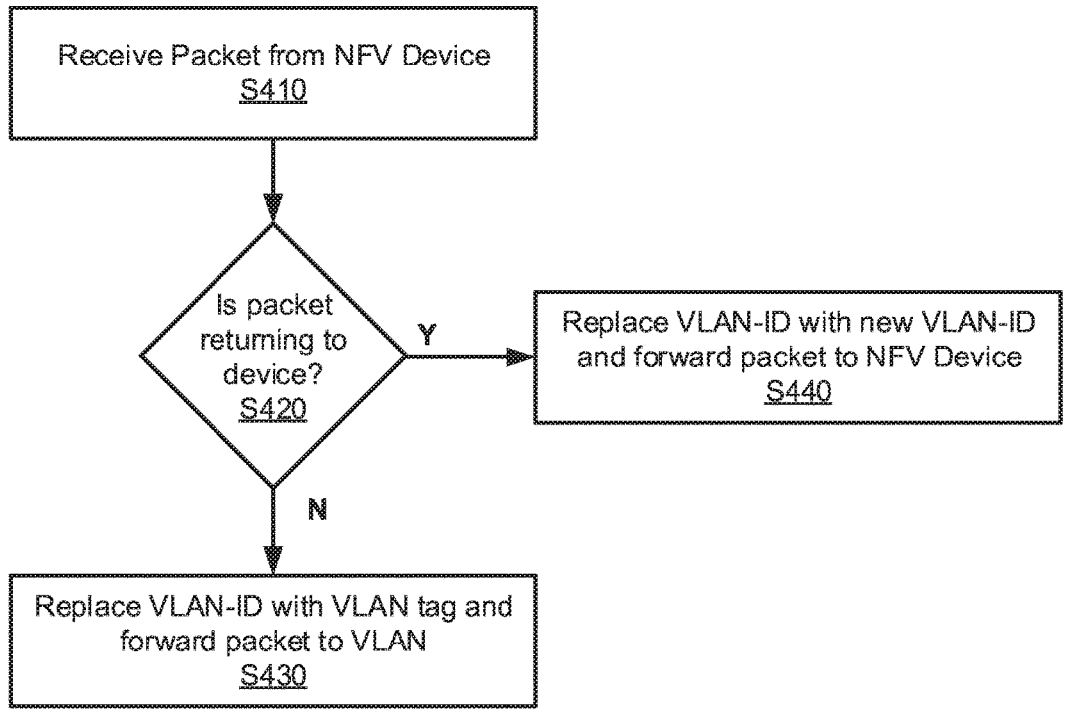
FIG. 4A is a flowchart illustrating the operations of the VLAN of FIG. 3 during ingress of a data packet, in accordance with an embodiment of the invention.

FIG. 4A is a flow chart illustrating a method for handling packet ingress by VLAN 104. Referring to step S410, VLAN 104 receives a data packet from an NFV device 102 connected by a tagged access port 125A of the switch 120, where the packet is tagged according to sub-interface of the VLAN 104 to which the NFV device 102 belongs, using a VLAN-ID located in a VLAN location of a data packet using an 802.1Q protocol.

Referring to step S420, VLAN 104 determines if the packet is being sent back to the physical device that is hosting the sending NFV device 102. The determined routing is based on whether NFV device 102 is listed as having a VLAN-ID associated with a tagged access port 125A of the switch 120, in tagged access port list 106. If the NFV device 102 is listed in the tagged access port list 106 for the receiving VLAN 104, VLAN 104 determines the packet is returning, and the method for handling packet ingress proceeds to step S440. If the NFV device 102 is not listed in the tagged access port list 106 for the receiving VLAN 104, VLAN 104 determines the packet is not returning, and the method for handling packet ingress proceeds to step S430.

Referring to step S430, VLAN 104 replaces sub-interface (VLAN-ID) tag with a VLAN tag, and forwards the packet is transferred through VLAN based on normal protocols. Additionally, the VLAN-ID may be recorded in the tagged access port list 106, along with the associated tagged access port 125A of the switch 120 and virtual MAC address.

Referring to step S440, VLAN 104 replaces the VLAN-ID tag of the incoming packet with a VLAN-ID tag of the destination NFV device 102 connected to the switch 120 by a tagged access port 125A. VLAN 104 forwards the packet to the NFV device 102. Such a procedure may be referred as a hair-pin.

Figure 4B:
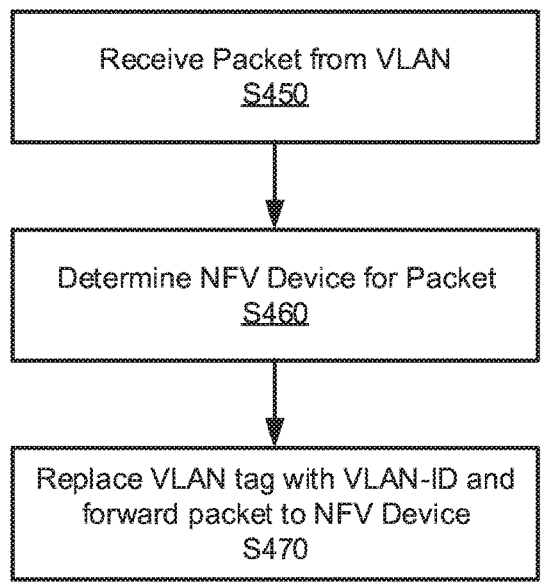
FIG. 4B is a flowchart illustrating the operations of the VLAN of FIG. 3 during egress of a data packet, in accordance with an embodiment of the invention.

FIG. 4B is a flow chart illustrating a method for handling packet egress by VLAN 104. Referring to step S450, VLAN 104 receives a data packet through any host connected to VLAN 104, where the packet is tagged according to 802.1Q protocols. Under such protocols, the data packet contains a MAC address and a VLAN tag.

Referring to step S460, VLAN 104 determines an NFV device 102 as the destination for the packet. The NFV device 102 may be determined based on finding the associated MAC address for the NFV device in tagged access port list 106. In determining the NFV device 102, VLAN 104 also determines the associated tagged access port 125A, and VLAN-ID, associated with the NFV device 102.

Referring to step S470, VLAN 104 replaces the VLAN address in of 802.1Q tag of data packet with VLAN-ID determined in step S460. VLAN 104 then forwards the data packet through the tagged access port 125A, using the VLAN-ID to reach NFV device 102.

The following examples illustrate an example path of a data packet sent from NFV device A 102A. The data packet may leave the NFV device A 102A, tagged with a VLAN-ID associated with NFV device A 102A, and travel through an ethernet port 115A located on first device 110A, to a tagged access port 125A of switch 120. In this example, the ethernet port 115A and tagged access port 125A work as ingress and egress points for the data packets from NFV device A 102A and NFV device B 102B to VLAN 104, and vice versa. VLAN 104 then determines whether the data packet is returning to the first device through the same tagged access port 125A (i.e. a hair-pin) based on whether the MAC address for the destination of the data packet is located in tagged access port list 106. In this example, the MAC address is not located in tagged access port list 106A, so VLAN 104 replaces the local VLAN-ID with the tag for VLAN tag, and may forward the data packet following normal protocols to the switch connected to the second device 110B. In this example, the data packet is at the switch connected to the second device 110B, VLAN 104 searches tagged access port list 106B based on the tagged access port 125B, for the VLAN-ID associated with the destination MAC address, and replaces the VLAN tag of the data packet with the VLAN-ID, such as, for example, the VLAN-ID associated with NFV device C 102C. VLAN 104 then forwards the data packet to NFV device C 102C, through the tagged access port 125B of switch 120 and ethernet port 115B of second device 110B, and the data packet arrives at NFV device C 102C. Similar to above, the ethernet port 115B and tagged access port 125B work as ingress and egress points for the data packets from NFV device C 102C to VLAN 104, and vice versa.

In an alternative example, the data packet may leave the NFV device A 102A, tagged with a VLAN-ID associated with NFV device A 102A, and travel through an ethernet port 115A located on first device 110A, to a tagged access port 125A of switch 120. In this example, the ethernet port 115A and tagged access port 125A work as ingress and egress points for the data packets from NFV device A 102A and NFV device B 102B to VLAN 104, and vice versa. VLAN 104 then determines whether the data packet is not outgoing based on the MAC address for the destination of the data packet being located in tagged access port list 106. In this example, since the MAC address is located in tagged access port list 106, VLAN 104 replaces the local VLAN-ID associated with NFV device A 102A with the VLAN-ID for the receiving device, NFV device B 102B. VLAN 104 then forwards the data packet to NFV device B 102B, through the tagged access port 125A of switch 120 and ethernet port 115A of first device 110A, and the data packet arrives at NFV device B 102B. Similar to above, the ethernet port 115A and tagged access port 125A work as ingress and egress points for the data packets from NFV device A 102A and NFV device B 102B to VLAN 104, and vice versa. Such a maneuver by VLAN 104 may be referred to as a hairpin.

Figure 5:
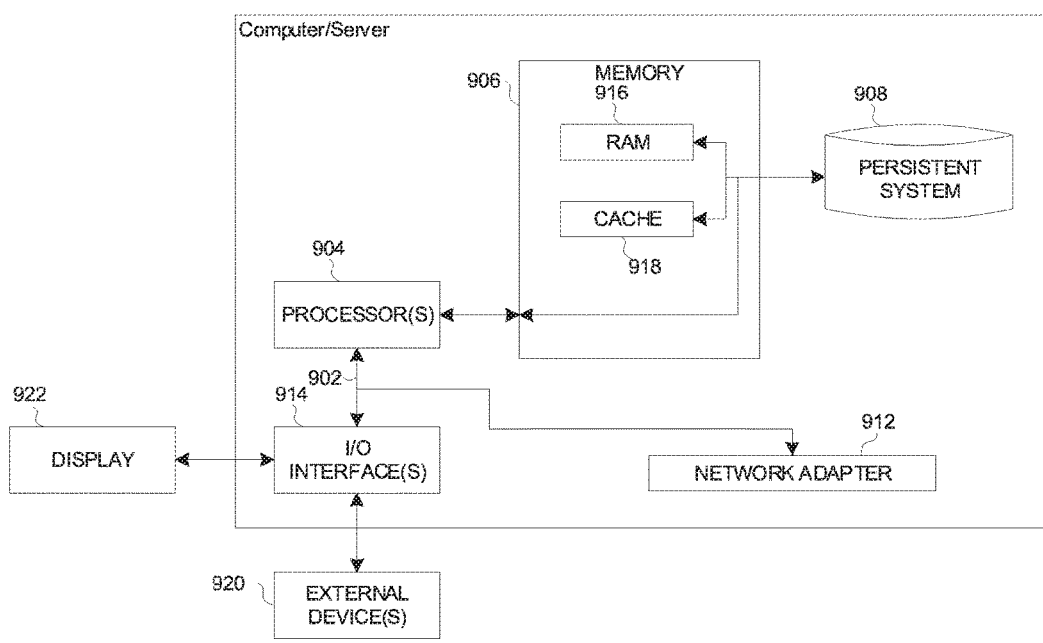
FIG. 5 is a block diagram depicting the hardware components of the virtualized network infrastructure of FIG. 3, in accordance with an embodiment of the invention.

FIG. 5 depicts a block diagram of components of device 110 and switch 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Device 110 and switch 120 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs NFV device 102 in device 110; and VLAN 104 and tagged access port list 106 in switch 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs NFV device 102 in device 110; and VLAN 104 and tagged access port list 106 in switch 120 may be downloaded to persistent storage 908 through communications unit 912.

I/O interface(s) 914 allows for input and output of data with other devices that may be connected to device 110 and switch 120. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., The programs NFV device 102 in device 110; and VLAN 104 and tagged access port list 106 in switch 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for handling virtual network traffic, the method comprising:
   receiving a data packet by a virtual LAN (VLAN) located on a switch;
   determining a virtual device, located on a physical device, associated with the data packet;
   determining a tagged access port between the switch and the physical device, wherein the tagged access port handles all network traffic between the switch and the physical device, and wherein the connection between the physical device and the switch is configured as 802.1Q trunk port;
   determining a VLAN-ID based on the tagged access port and the virtual device;
   replacing a VLAN tag of an address of the data packet with the VLAN-ID; and
   routing the data packet to the virtual device based on the VLAN-ID.

2. The method of claim 1, wherein the physical device hosts a plurality of virtual devices.

3. The method of claim 1, wherein determining the VLAN-ID comprises searching a database for the VLAN-ID associated with the tagged access port and the virtual device.

4. The method of claim 3, wherein the VLAN-ID is only used by the tagged access port, and wherein there are a plurality of other tagged access ports located on the switch.

5. The method of claim 1, wherein the data packet is received by the VLAN through the tagged access port, and wherein the data packet is sent to the virtual device through the same access port.

6. A computer program product for handling virtual network traffic, the computer program product comprising:
   one or more computer-readable tangible storage devices and program instructions stored on at least one of the one or more tangible storage devices, the program instructions comprising:
   receiving a data packet by a virtual LAN (VLAN) located on a switch;
   determining a virtual device, located on a physical device, associated with the data packet;
   determining a tagged access port between the switch and the physical device, wherein the tagged access port handles all network traffic between the switch and the physical device, and wherein the connection between the physical device and the switch is configured as 802.1Q trunk port;
   determining a VLAN-ID based on the tagged access port and the virtual device;
   replacing a VLAN tag of an address of the data packet with the VLAN-ID; and
   routing the data packet to the virtual device based on the VLAN-ID.

7. The computer program product of claim 6, wherein the physical device hosts a plurality of virtual devices.

8. The computer program product of claim 6, wherein determining the VLAN-ID comprises searching a database for the VLAN-ID associated with the tagged access port and the virtual device.

9. The computer program product of claim 8, wherein the VLAN-ID is only used by the tagged access port, and wherein there are a plurality of other tagged access ports located on the switch.

10. The computer program product of claim 6, wherein the data packet is received by the VLAN through the tagged access port, and wherein the data packet is sent to the virtual device through the same access port.

11. A computer system for handling virtual network traffic, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    receiving a data packet by a virtual LAN (VLAN) located on a switch;
    determining a virtual device, located on a physical device, associated with the data packet;
    determining a tagged access port between the switch and the physical device, wherein the tagged access port handles all network traffic between the switch and the physical device, and wherein the connection between the physical device and the switch is configured as 802.1Q trunk port;
    determining a VLAN-ID based on the tagged access port and the virtual device;
    replacing a VLAN tag of an address of the data packet with the VLAN-ID; and
    routing the data packet to the virtual device based on the VLAN-ID.

12. The computer system of claim 11, wherein the physical device hosts a plurality of virtual devices.

13. The computer system of claim 11, wherein determining the VLAN-ID comprises searching a database for the VLAN-ID associated with the tagged access port and the virtual device.

14. The computer system of claim 13, wherein the VLAN-ID is only used by the tagged access port, and wherein there are a plurality of other tagged access ports located on the switch.

* * * * *